United States Patent
Wang et al.

(10) Patent No.: US 12,003,649 B2
(45) Date of Patent: Jun. 4, 2024

(54) ANONYMOUS EVENT ATTESTATION WITH GROUP SIGNATURES

(71) Applicant: Google LLC, Mountain View, CA (US)

(72) Inventors: Gang Wang, Jersey City, NJ (US); Marcel M. Moti Yung, New York, NY (US)

(73) Assignee: Google LLC, Mountain View, CA (US)

( * ) Notice: Subject to any disclaimer, the term of this patent is extended or adjusted under 35 U.S.C. 154(b) by 73 days.

(21) Appl. No.: 17/633,417

(22) PCT Filed: Mar. 16, 2021

(86) PCT No.: PCT/US2021/022506
§ 371 (c)(1),
(2) Date: Feb. 7, 2022

(87) PCT Pub. No.: WO2022/010549
PCT Pub. Date: Jan. 13, 2022

(65) Prior Publication Data
US 2022/0294643 A1    Sep. 15, 2022

(30) Foreign Application Priority Data
Jul. 9, 2020 (IL) .......................... 275954

(51) Int. Cl.
*H04L 9/32* (2006.01)
(52) U.S. Cl.
CPC .......... *H04L 9/3255* (2013.01); *H04L 9/3257* (2013.01); *H04L 9/3263* (2013.01); *H04L 2209/42* (2013.01)

(58) Field of Classification Search
None
See application file for complete search history.

(56) References Cited

U.S. PATENT DOCUMENTS

| 5,926,549 A | 7/1999 | Pinkas |
| 6,871,276 B1 | 3/2005 | Simon |

(Continued)

FOREIGN PATENT DOCUMENTS

| CA | 2796331 | 10/2011 |
| CN | 1937496 | 3/2007 |

(Continued)

OTHER PUBLICATIONS

International Preliminary Report on Patentability in International Appln. No. PCT/US2021/022495, dated Jan. 19, 2023, 10 pages.

(Continued)

*Primary Examiner* — Michael Pyzocha
(74) *Attorney, Agent, or Firm* — Fish & Richardson P.C.

(57) ABSTRACT

Methods, systems, and computer media provide attestation tokens that protect the integrity of communications transmitted from client devices, while at the same time avoiding the use of stable device identifiers that could be used to track client devices or their users. In one approach, client devices can receive anonymous certificates from a device integrity computing system signifying membership in a selected device trustworthiness group, and attestation tokens can be signed anonymously with the anonymous certificates using a group signature scheme. Client devices can include throttlers imposing limits on the quantity of attestation tokens created by the client device.

21 Claims, 9 Drawing Sheets

(56) References Cited

U.S. PATENT DOCUMENTS

| | | | |
|---|---|---|---|
| 10,154,061 | B1 | 12/2018 | Schetina |
| 10,735,205 | B1* | 8/2020 | Wentz ............... H04L 9/3257 |
| 10,742,421 | B1* | 8/2020 | Wentz ............... H04L 9/0897 |
| 11,706,199 | B2* | 7/2023 | Kong ............... H04L 9/0866 |
| | | | 713/168 |
| 2008/0270786 | A1 | 10/2008 | Brickell et al. |
| 2009/0129600 | A1* | 5/2009 | Brickell ............ H04L 9/3234 |
| | | | 380/282 |
| 2010/0325441 | A1* | 12/2010 | Laurie ............... H04L 9/3257 |
| | | | 713/185 |
| 2012/0047550 | A1 | 2/2012 | Lee et al. |
| 2012/0047578 | A1 | 2/2012 | Lee et al. |
| 2013/0042101 | A1 | 2/2013 | Neumann |
| 2013/0080771 | A1* | 3/2013 | Brickell ............ H04L 9/3234 |
| | | | 713/176 |
| 2013/0305364 | A1* | 11/2013 | Haikney ............ G06F 21/57 |
| | | | 726/22 |
| 2014/0006789 | A1* | 1/2014 | Grobman ........... G06F 21/552 |
| | | | 713/193 |
| 2014/0205090 | A1 | 7/2014 | Li et al. |
| 2014/0380058 | A1 | 12/2014 | Agarwal et al. |
| 2015/0156024 | A1 | 6/2015 | De Los Santos et al. |
| 2016/0080379 | A1* | 3/2016 | Saboori ............ H04W 12/0431 |
| | | | 726/5 |
| 2016/0286393 | A1* | 9/2016 | Rasheed ............ H04L 63/0853 |
| 2017/0289185 | A1 | 10/2017 | Mandyam |
| 2018/0287802 | A1* | 10/2018 | Brickell ............ H04L 9/3247 |
| 2018/0375663 | A1 | 12/2018 | Saint et al. |
| 2019/0312730 | A1 | 10/2019 | Engan et al. |
| 2019/0319964 | A1* | 10/2019 | Smith ............... H04L 69/22 |
| 2020/0112442 | A1* | 4/2020 | Wentz ............... H04L 9/3297 |
| 2020/0153627 | A1* | 5/2020 | Wentz ............... G06F 21/6218 |
| 2020/0162251 | A1 | 5/2020 | Wentz |
| 2020/0186350 | A1* | 6/2020 | Wentz ............... G06F 21/62 |
| 2020/0213306 | A1 | 7/2020 | Thomsen |
| 2020/0287890 | A1* | 9/2020 | Edgington ......... H04L 63/0823 |
| 2020/0320340 | A1 | 10/2020 | Wentz |

FOREIGN PATENT DOCUMENTS

| | | |
|---|---|---|
| CN | 102594558 | 7/2012 |
| CN | 103999402 | 8/2014 |
| CN | 107800688 | 3/2018 |
| CN | 107948143 | 4/2018 |
| CN | 108696349 | 10/2018 |
| CN | 109005035 | 12/2018 |
| CN | 109391631 | 2/2019 |
| CN | 109688119 | 4/2019 |
| CN | 109788482 | 5/2019 |
| CN | 110782252 | 2/2020 |
| JP | 2009-027708 | 2/2009 |
| JP | 2009-539172 | 11/2009 |
| JP | 2013-175040 | 9/2013 |
| JP | 2020-042691 | 3/2020 |
| WO | WO 2019040144 | 2/2019 |

OTHER PUBLICATIONS

International Preliminary Report on Patentability in International Appln. No. PCT/US2021/022506, dated Jan. 19, 2023, 9 pages.
Office Action in Israeli Appln. No. 275947, dated Dec. 30, 2022, 3 pages.
Office Action in Israeli Appln. No. 275954, dated Jan. 15, 2023, 3 pages.
Office Action in Indian Appln. No. 202227006685, dated Mar. 9, 2023, 8 pages (with English translation).
Office Action in Indian Appln. No. 202227006460, dated Mar. 17, 2023, 8 pages (with English translation).
Notice of Allowance in Japanese Appln. No. 2022-514770, dated Apr. 17, 2023, 5 pages (with English translation).
Office Action in Japanese Appln. No. 2022-514565, dated Jun. 5, 2023, 6 pages (with English translation).
Office Action in Korean Appln. No. 10-2022-7006853, dated Jul. 17, 2023, 11 pages (with English translation).
Desmoulins et al., "Direct Anonymous Attestations with Dependent Basename Opening," International Conference on Image Analysis and Processing, Sep. 9-13, 2013, 16 pages.
Developer.android.com [online], "SafetyNet Attestation API" Jul. 2018, retrieved on Oct. 5, 2022, retrieved from URL <https://developer.android.com/training/safetynet/attestation#transfer-response-to-server>, 17 pages.
International Search Report and Written Opinion in International Appln. No. PCT/US2021/022495, dated Jun. 9, 2021, 17 pages.
International Search Report and Written Opinion in International Appln. No. PCT/US2021/022506, dated Jun. 15, 2021, 16 pages.
Kaiser et al., "Transport Layer Security (TLS) Authentication using ITS ETSI and IEEE certificates," TLS Working Group, Mar. 13, 2017, 16 pages.
Lu et al. "5G Vehicle-to-Everything Services: Gearing Up for Security and Privacy," Proceedings of the IEEE, vol. 108, No. 2, Feb. 1, 2020, 17 pages.
Wang et al., "RPRep: A Robust and Privacy-Preserving Reputation Management Scheme for Pseudonym-Enabled VANETs," International Journal of Distributed Sensor Networks, vol. 2016, Article ID 6138251, Nov. 8, 2015, 16 pages.
Wikipedia.org [online], "Commitment scheme" Jan. 2004, retrieved on Oct. 5, 2022, retrieved from URL <https://en.wikipedia.org/wiki/Commitment_scheme>, 15 pages.
Wikipedia.org [online], "Group signature" Dec. 2005, retrieved on Oct. 5, 2022, retrieved from URL <https://en.wikipedia.org/wiki/Group_signature>, 3 pages.
Office Action in Chinese Appln. No. 202180005216.5, dated Dec. 4, 2023, 21 pages (with English translation).
Cisco, "TLS 1.3 Authentication using ETSI TS 103 097 and IEEE 1609.2 certificates draft-tls-certieee1609-01.txt" TLS Working Group, Aug. 18, 2018, 23 pages.
Notice of Allowance in Chinese Appln. No. 202180005216.5, mailed on Jan. 22, 2024, 9 pages (With English translation).
Office Action in Chinese Appln. No. 202180005231.X, mailed on Mar. 27, 2024, 11 pages (with English translation).

* cited by examiner

ANONYMOUS EVENT ATTESTATION WITH GROUP SIGNATURES

CROSS-REFERENCE TO RELATED APPLICATIONS

This application is a National Stage Application under 35 U.S.C. § 371 and claims the benefit of International Application No. PCT/US2021/022506, filed Mar. 16, 2021, which claims priority to IL Application No. 275954, filed Jul. 9, 2020, entitled ANONYMOUS EVENT ATTESTATION WITH GROUP SIGNATURES. The disclosures of the foregoing applications are incorporated herein by reference in their entirety.

BACKGROUND

Client devices transmit requests and other data over public networks, such as the Internet. These communications can be altered by other parties, such as parties that intercept the communications and/or intermediaries that receive the communications and forward them to other parties.

Client devices are also subject to malicious attacks, such as viruses and malware that can send fraudulent requests without the users knowledge or authorization. In addition, other parties can emulate a client device to send requests that appear to originate from the client device, but actually come from a device of the other parties.

Various authentication techniques can be used to prevent fraud and abuse and to protect the integrity of transactions over public networks. At the same time, these authentication techniques can implicate privacy concerns. For example, users of client devices may not wish to share information (such as stable device identifiers) that could be used to track client devices or the users of these client devices, and data providers may operate under privacy protection standards that prevent them from receiving or handling such information.

SUMMARY

This specification describes technologies relating to authentication techniques for protecting the integrity of communications transmitted from client devices, while at the same time avoiding the use of stable device identifiers that could be used to track client devices or their users.

In general, a first innovative aspect of the subject matter described in this specification can be embodied in computer-implemented methods that include: receiving, by a device integrity computing system and from a client device, a request for N device integrity elements, the request including device-level fraud detection signals for the client device and, for each of the N device integrity elements, public key data including at least one of (i) a respective public key for the device integrity element or (ii) a derivative of the respective public key for the device integrity element; determining, by the device integrity computing system and based at least on the device-level fraud detection signals, a verdict of trustworthiness of the client device; for each of the N device integrity elements, generating, by the device integrity computing system, the device integrity element using at least the public key data for the device integrity element, wherein the device integrity element includes a digital signature generated based on a set of content including the public key data for the device integrity element; and transmitting, by the device integrity computing system, the N device integrity elements to the client device. N can be, for example, an integer that is greater than or equal to two. Other implementations of this aspect include corresponding apparatus, systems, and computer programs, configured to perform the aspects of the methods, encoded on computer storage devices.

In some aspects, each device integrity element includes a respective device integrity token including the set of content for the device integrity element, wherein the set of content for the device integrity element includes a timestamp indicating a time at which the verdict of trustworthiness was determined and the public key data for the device integrity element; and generating each device integrity element includes digitally signing the set of content for the device integrity element using a private key of the device integrity computing system. The set of content for the device integrity element can further include the verdict of trustworthiness.

In some aspects, generating each device integrity element includes generating, using a blind signature scheme, a blind signature of the public key data for the device integrity element, wherein the device integrity element is the blind signature. The methods can further include publishing M blind signature verification keys corresponding to M trustworthiness levels for client devices, and retaining M respective signing keys corresponding to the M verification keys.

In some aspects, the determining of the verdict of trustworthiness can include assigning to the client device a level of trustworthiness selected from the M trustworthiness levels. For example, the public key data for each device integrity element can include the derivative of the public key for the device integrity element, and the derivative of the public key for the device integrity element can include a blinded public key blinded using the blind signature scheme. The derivative of the public key for the device integrity element can include a blinded truncated cryptographic hash of the public key for the device integrity element.

In some aspects, the blind signature scheme includes a privately verifiable blind signature scheme. For example, the privately verifiable blind signature scheme can be an IETF VOPRF blind signature scheme.

In other aspects, the blind signature scheme includes a publicly verifiable blind signature scheme. For example, the publicly verifiable blind signature scheme can be a blind RSA signature scheme.

Another innovative aspect of the subject matter described in this specification can be embodied in methods performed by a client device that include: transmitting, to a device integrity computing system, a first request for an anonymous certificate, the request including device-level fraud detection signals for the client device; receiving, from the device integrity computing system, the anonymous certificate, wherein the anonymous certificate corresponds to a given signature group selected from a set of device trustworthiness groups based at least on the device-level fraud detection signals, wherein each device trustworthiness group corresponds to a respective category of trustworthiness; creating an anonymous attestation token including (i) a set of data including a second request and an attestation token creation timestamp indicating a time of creation of the anonymous attestation token, and (ii) a digital signature of the set of data generated using a group signature scheme with the anonymous certificate; and transmitting the attestation token to a recipient. Other implementations of this aspect include corresponding apparatus, systems, and computer programs, configured to perform the aspects of the methods, encoded on computer storage devices.

In some aspects, the group signature scheme is a direct anonymous attestation (DAA) signing scheme. The DAA signing scheme can be an elliptic curve cryptography (ECC) DAA signing scheme. The ECC DAA signing scheme can be an ECC DAA signing scheme with Barreto-Naehrig curves.

In some aspects, the anonymous certificate is an irrevocable anonymous certificate indicating that the client device has been irrevocably assigned to the given signature group.

In some aspects, the set of device trustworthiness groups includes at least a first trustworthiness group that includes, as members, devices having a first degree of trustworthiness and a second trustworthiness group that includes, as members, devices having a second degree of trustworthiness less than the first degree of trustworthiness, wherein the given group is one of the first group or the second signature group. The first and second trustworthiness groups can have corresponding first and second group public keys published by the device integrity computing system.

In some aspects, the methods further include storing the anonymous certificate in a secure private keystore on the client device.

In some aspects, the token creation timestamp has a time resolution that is less than about a millisecond or less than about a microsecond.

In some aspects, the methods further include: receiving information indicating an attestation token quantity limit; and prior to the creating, verifying that the creating would not exceed the attestation token quantity limit. The attestation token quantity limit can be a limit on the number of anonymous tokens that are eligible to be sent from the client device to selected destination domain within a selected time frame; or the attestation token quantity limit can be a limit on the number of anonymous tokens that are eligible to be sent from one or more selected applications on the client device to a selected destination domain within a selected time frame; or the attestation token quantity limit can be a limit on the number of anonymous tokens that are eligible to be sent from the client device to selected endpoint within a selected destination domain within a selected time frame; or the attestation token quantity limit can be a limit on the number of anonymous tokens that are eligible to be sent from one or more selected applications on the client device to a selected endpoint within a selected destination domain within a selected time frame; or any combination thereof.

The subject matter described in this specification can be implemented in particular embodiments so as to realize one or more of the following advantages.

Using attestation tokens to transmit data from client devices provides a secure communication channel between the client device and the computers or other devices of other entities. Including, with the attestation token, a digital signature of the data included in the attestation token enables the entities to verify that the data in the attestation token was not changed after the attestation token was created. In addition, the inclusion of a token creation time in the attestation token enables recipients to determine whether requests are new or potentially part of a replay attack.

The attestation token can also include a device integrity token that indicates the integrity of the client device that transmitted the attestation token, which enables the recipient(s) of the attestation token to verify that the data came from a trusted client device, e.g., rather than from an emulator or a compromised device. The device integrity token can be generated and digitally signed by a trusted device analyzer (e.g., a third-party device analyzer) so that recipients of the attestation token can verify that the client device was evaluated by a trusted device analyzer and that the data in the device integrity token was not modified after creation by the trusted device analyzer.

While attestation tokens protect the integrity of communications transmitted from client devices, there are potential privacy issues associated with the use of attestation tokens. A first privacy issue is that reuse of the same device integrity token within multiple attestation tokens can potentially enable an attestation token recipient to correlate multiple requests transmitted by the same client device and aggregate user data based on the correlation. The techniques described in this document can enhance privacy against such correlation by using multiple device integrity tokens, each including a unique public key of the client device. For example, the client device can generate a batch of N public/private key pairs, and then send the N public keys to the third-party device analyzer to receive a batch of N corresponding device integrity tokens. Then the client device can, for example, use a new device integrity token for each request; or the client device can use the same device integrity token for all requests within a certain interval of time; or the client device can use the same device integrity token for all requests originated from the same application on the client device; or some combination thereof. Limiting the use of each public key limits the amount of requests that a recipient can correlate based on the public key. Using this batch approach also reduces the burden on the device analyzer by having fewer requests to process, reduces the consumption of network bandwidth, and reduces latency at the client device when transmitting a request that will include a device integrity token that would otherwise be introduced if the client device sent a request for a device integrity token each time a device integrity token was needed.

A second privacy issue is that sharing stable public keys of the client device with the device analyzer can potentially enable the device analyzer to track the client device. For example, by colluding with the device analyzer, the recipient of multiple distinct attestation tokens may learn that the device analyzer received those attestation tokens in the same batch request from the same device, and therefore the recipient of such attestation tokens can correlate multiple requests transmitted by the same client device and aggregate user data based on the correlation. The techniques described in this document can enhance privacy against such tracking by sending blinded versions of the public keys to the device analyzer rather than the raw values of the public keys. For example, the client device can generate a batch of N public-private key pairs, blind the N public keys (or a cryptohash of public keys), and then send the N blinded keys to the device analyzer; the third-party device analyzer returns a batch of N corresponding blind signatures without ever receiving the raw values of the client device public keys.

Further aspects of the present disclosure may provide the advantage of enhancing privacy against tracking both by trusted device analyzers and by attestation token recipients, by using a group signature scheme rather than a public key signature scheme. For example, the third-party device analyzer can assign the client device to a signature group corresponding to a level of trustworthiness of the client device and provide the client device with an anonymous certificate for the signature group. Then, the client can sign each attestation token using a group signature scheme with the anonymous certificate, and the attestation token recipient can validate the anonymous signature using a public group key that is published by the third-party device analyzer. Using this approach relieves the resources of the client device of the burden of creating many public/private key pairs and relieves the resources of the device analyzer of the burden of creating device integrity tokens for each public key. This frees up the respective resources to perform other functions and enables the device analyzer to evaluate more client devices in a shorter period of time using the freed up resources. Therefore, the use of a group signature scheme provides a more efficient process as the generation of public/private key pairs is reduced.

Various features and advantages of the foregoing subject matter are described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

Figure 1:
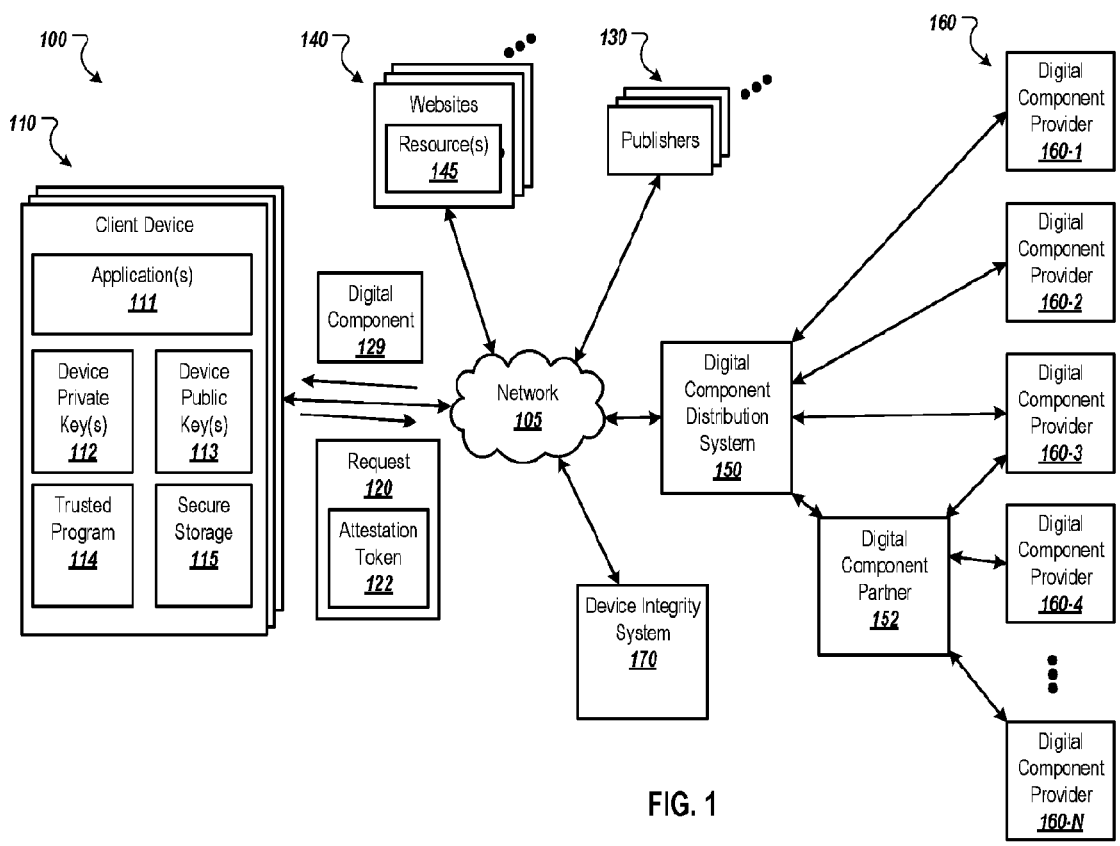
FIG. 1 is a block diagram of an environment in which a digital component system distributes digital components.

In general, systems and techniques described herein can provide a secure communication channel between client devices and other entities, such as content publishers, digital component distribution systems, and digital component providers that create and provide digital components for distribution by the digital component distribution system. The client devices can provide, with requests and other data transmissions over a network, an attestation token that is used by the other entities to validate the integrity of the requests and the integrity of the client device. The requests can include, for example, requests to manage data of the users (e.g., to delete user-related data), requests for content, and/or requests for digital components to present with other content. Securing the communication channel using the attestation token ensures that fraudulent users cannot change, delete, or otherwise access user data, or change the content of the requests, or create new requests, e.g., to deceive digital component distribution systems and/or providers.

In some approaches, the attestation token can be digitally signed using a private key of the client device. The client device can confidentially maintain the private key. The attestation token can include, among other things, a public key that corresponds to the private key, a payload, and a device integrity token. The device integrity token can include a verdict that indicates a level of integrity of the client device, as determined by a trusted device integrity system, e.g., a third-party device integrity system maintained by an entity that is different from a user of the client device and the recipient of the attestation token. The device integrity token can also include the public key (or cryptohash of the public key) of the client device to bind the device integrity token to the client device.

The device integrity token can be digitally signed by the device integrity system using a private key that the device integrity system keeps confidential. A public key that corresponds to this private key can be provided to the recipients so that they can trust that the client device was evaluated by the device integrity system, e.g., by verifying the digital signature of the device integrity token using the public key. This combination of using two pairs of keys provides a secure communication channel that enables recipients to validate the integrity of client devices and the integrity of communications received from the client devices and binds the device integrity token to the client device so that other devices cannot use the device integrity token to falsify their integrity.

In some approaches, the device integrity system does not receive the raw data of the public keys for inclusion in the device integrity token. Instead, the client device can send a blinded public key or a blinded derivative of the public key (e.g., a blinded truncated cryptohash of the public key) by blinding the public key or its derivative using a blind signature scheme. With a blind signature scheme, the device integrity system can certify the integrity of the client device without receiving raw values of public keys of the client device, enhancing the privacy of the client device or user by reducing the risk of potential tracking via public key. The device integrity system can publish blind signature verification keys that recipients can use to verify the blind signatures.

In other approaches, a group signature scheme can be used, with the device integrity system as a group manager. For example, the device integrity system can publish M group verification keys for M trustworthiness groups, assign the client device to one of the M trustworthiness groups, and deliver an anonymous certificate to the client device. The client device can anonymously sign attestation tokens using the anonymous certificate and these anonymous signatures can be verified by recipients using the published group verification keys. With a group signature scheme, neither the device integrity system nor the recipient of the attestation token needs to receive raw values of public keys of the client device, further enhancing the privacy of the client device or user by reducing the risk of potential tracking via public key.

FIG. 1 is a block diagram of an environment 100 in which a digital component system 150 distributes digital components 129. The example environment 100 includes a data communication network 105, such as a local area network (LAN), a wide area network (WAN), the Internet, a mobile network, or a combination thereof. The network 105 connects client devices 110, publishers 130, websites 140, a digital component distribution system 150, and a device integrity system 170 (which can also referred to as a device integrity computing system). The example environment 100 may include many different client devices 110, publishers 130, websites 140, digital component distribution systems 150, and device integrity systems 170.

A website 140 is one or more resources 145 associated with a domain name and hosted by one or more servers. An example website is a collection of web pages formatted in HTML that can contain text, images, multimedia content, and programming elements, such as scripts. Each website 140 is maintained by a publisher 130, which is an entity that controls, manages and/or owns the website 140.

A resource 145 is any data that can be provided over the network 105. A resource 145 is identified by a resource address, e.g., a Universal Resource Locator (URL), that is associated with the resource 145. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts).

A client device 110 is an electronic device that is capable of communicating over the network 105. Example client devices 110 include personal computers, mobile communication devices, e.g., smart phones, digital media players, smart speakers, wearable devices (e.g. smart watches), and other devices that can send and receive data over the network 105. A client device 110 typically includes applications 111, such as a web browser and/or native applications to facilitate the sending and receiving of data over the network 105. A native application is an application developed for a particular platform or a particular device. Publishers 130 can develop and provide the native applications to the client devices 110.

Some resources 145, application pages, or other application content can include digital component slots for presenting digital components with the resources 145 or application pages. As used throughout this document, the phrase "digital component" refers to a discrete unit of digital content or digital information (e.g., a video clip, audio clip, multimedia clip, image, text, or another unit of content). A digital component 129 can electronically be stored in a physical memory device as a single file or in a collection of files, and digital components can take the form of video files, audio files, multimedia files, image files, or text files and include advertising information, such that an advertisement is a type of digital component. For example, the digital component 129 may be content that is intended to supplement content of a web page, resource, or application page presented by an application 111. More specifically, the digital component 129 may include digital content that is relevant to the resource content (e.g., the digital component may relate to the same topic as the web page content, or to a related topic). The provision of digital components by the digital component distribution system 150 can thus supplement, and generally enhance, the web page content.

When the application 111 loads a resource 145 or application content that includes one or more digital component slots, the application 111, which could be a web browser, can request a digital component 129 for each slot from the digital component distribution system 150. The digital component distribution system 150 can, in turn request digital components from digital component providers 160. The digital component providers 160 are entities that provide digital components for presentation with resources 145 and/or other content. An example digital component provider is an advertiser that provides an advertisement.

In some cases, the digital component distribution system 150 can also request digital components from one or more digital component partners 152. A digital component partner 152 is an entity that selects digital components on behalf of digital component providers 160 in response to digital component requests.

The digital component distribution system 150 can select a digital component for each digital component slot based on various criteria. For example, the digital component distribution system 150 can select, from the digital components received from the digital component providers 160 and/or the digital component partners 152, a digital component based on relatedness to the resource 145 or other application content, performance of the digital component (e.g., a rate at which users interact with the digital component), etc. The digital component distribution system 150 can then provide the selected digital component(s) to the client device 110 for presentation with the resource 145 or other application content. The digital component distribution system 150 can transmit selected digital components 129 to one or more client devices 110 for presentation by applications 111 operating on the client devices 110.

When the application 111 sends a request 120 over the network 105, the application 111 can send an attestation token 122 with the request. For example, if the application 111 sends a digital component request to the digital component distribution system 150, this request can include an attestation token 122. Similarly, if the application 111 sends a request to another entity (e.g., to a publisher 130, the digital component distribution system 150, the digital component partner 152, or a digital component provider 160) to manage, e.g., delete, the data stored by that entity, this request can include an attestation token 122.

In some implementations, the application 111 is configured to send attestation tokens 122 for specified types of requests. For example, each application 111 that sends attestation tokens 122 can include a software development kit (SDK) or application programming interface (API) that causes the application 111 to generate and/or send the attestation tokens 122. The SDK can specify a set of requests, e.g., requests for managing user data, requesting digital components, etc., for which attestation tokens 122 are to be included. Other types of requests, e.g., requesting a news web page, may not require an attestation token 122.

The client device 110 can also include a trusted program 114 that generates the attestation tokens for the applications 111. The trusted program 114 can include trusted code from a reliable source that is difficult to falsify. For example, the trusted program 114 can be an operating system, a portion of an operating system, a web browser, etc. Generally, the trusted program 114 is difficult to infiltrate, and the amount of time and effort that a perpetrator would need to expend to tamper with the trusted program 114 is prohibitively high. Additionally, because the trusted program 114 is provided and maintained by a reliable source, any vulnerabilities that arise can be addressed by the source. Using such a trusted program in this way provides a technical advantage of increased security at the client device, since the trusted program is difficult to infiltrate. Additionally, the trusted program provides the advantage of mitigating vulnerabilities in the trusted program because the program is maintained by a reliable source.

The trusted program 114 can be local to client device 110. For example, the trusted program 114 can be a device driver of the operating system of client device 110. In some implementations, the trusted program 114 operates entirely locally to client device 110, reducing the need to transmit user information. In some implementations, the trusted program 114 can operate locally to client device 110 and over a network, such as the network 105. For example, the trusted program 114 can be a web browser that is installed on user device 110 and transmits and receives information over the network 105.

The trusted program 114 can generate encryption keys (e.g., public/private key pairs), store encryption keys in secure storage 115 (e.g., a secure cache), store device integrity tokens in secure storage 115, generate attestation tokens, generate blind signatures of encryptions keys or derivatives thereof, and/or fetch and store certificates, as described in more detail below. In some implementations, the trusted program 114 interacts with a device integrity client to send to and receive data from the device integrity system 170. In some implementations, the trusted program 114 is configured to generate an attestation token 122 for each of a set of specified types of requests, e.g., requests to change user privacy settings.

The attestation token 122 is used by entities to validate the integrity of the request and the integrity of the client device 110. For example, enabling users to manage their data that is stored by other entities can open up the possibility of malicious users attempting to manage and/or steal other users' data. For digital components, some malicious entities may attempt to falsify the parameters of digital component requests, e.g., to specify different resources with which the digital component will be provided and/or to specify a different user to which the digital component will be presented to make the request appear more valuable than it actually is. In addition, some malicious parties may attempt to emulate others' client devices for nefarious purposes.

The attestation token 122 provides a secure communication channel between the client device 110 and the computers or other devices of other entities through intermediaries that prevents others from altering the requests 120 and ensures that the request 120 came from a validated client device 110.

The trusted program 114 can generate different types of attestation tokens 122 that have different forms or that contain different content. In some implementations, the attestation token 122 includes a set content that includes a public key 113 of the client device 110, a token creation time that indicates a time at which the attestation token 122 is created, payload data, and a device integrity token that is generated by the device integrity system 170 or by the trusted program 114 using data received from the client device 110. The attestation token 122 can also include a digital signature generated by the trusted program 114 using a private key 112 that corresponds to the public key 113 included in the attestation token 122 and the set of content. That is, the trusted program 114 can digitally sign the set of content using the private key 112 and include the resulting digital signature in the attestation token 122 with the set of content.

In some implementations, the attestation token 122 includes a set of content that includes payload data, an attestation token creation time that indicates the time at which the attestation token 122 is created, and a digital signature of the set of content. In this example, the trusted program 114 can generate the digital signature using a group signature scheme and a certificate issued to the client device 110 by the device integrity system 170.

In either example, the client device 110 can include an attestation token 122 in requests 120 sent to the digital component distribution system 150 or other recipients. The recipients of the attestation token 122 can attempt to validate the attestation token 122 and/or the device integrity token included in the attestation token 122 (if appropriate). If the attestation token 122 is successfully validated, the recipient can determine whether the client device 110 is a trusted device and process the request accordingly. If the attestation token 122 is not successfully validated, the recipient can ignore or delete the request 120, e.g., without responding to or changing data in response to the request 120. Example processes for generating requests that include attestation tokens 122 and validating the attestation tokens are illustrated in FIGS. 2-8 and described below.

The attestation token creation time indicates a time at which the attestation token 122 was created. The trusted program 114 can record the creation time when the trusted program 114 creates the attestation token. This attestation token creation time can be a high resolution timestamp (e.g., accurate to the second, to the millisecond, or to the microsecond). The attestation token creation time can be used to determine whether a request 120 that includes the attestation token 122 is a new or recent request. For example, the entity that receives the attestation token 122 can compare the token creation time to a current time or a time at which the attestation token 122 was received. If the difference between the two times exceeds a threshold, the entity can determine that the request is not new, or invalid, as described in more detail below.

The attestation token creation time can also be used to detect replay attacks. For example, if multiple requests having the same set of data, including the same attestation token creation time, are received, the entity that receives the requests can determine that the requests are duplicates and/or that the requests are part of a replay attack.

The attestation token creation time, in combination with other data, can also serve as a transaction identifier for a request 120. For example, the transaction identifier can be a combination of two or more of the attestation token creation time of the attestation token 122 and a public key 113 of the attestation token 122 in implementations in which the attestation token 122 includes a public key 113. The transaction identifier can be used to deduplicate multiple versions of the same request received from multiple channels. For example, the digital component provider 160-3 can receive the same request from both the digital component distribution system 150 and the digital component partner 152. In this example, the transaction identifier can be based on the token creation time of the attestation token 122 and the public key 113 of the attestation token 122. The digital component provider 160-3 can compare the two pieces of data in two or more requests to determine whether the requests are duplicates.

The payload can include data for the individual request 120. For example, if the request 120 is for a digital component, the payload can include data that can be used to select a digital component. This payload could include the resource 145 that has the digital component slot (or a URL for the resource 145), information about the resource 145 (e.g., topic of the resource), information about the digital component slot (e.g., the number of slots, the type of slots, the size of the slots, etc.), information about the client device 110 (e.g., type of device, IP address of the device, geographic location of the client device 110) if the user has enabled this feature, and/or other appropriate information.

If the request 120 is to manage the user's data at a publisher 130, the digital component distribution system 150, the digital component partner 152, a digital component provider 160, or another entity, the request 120 can include data specifying the requested change. For example, if the user selected to remove all of the users data from a digital component provider 160-2, the payload would include data specifying this removal of data and the digital component provider 160-2 (e.g., an identifier or network address for the digital component provider 160-2).

The device integrity system 170 evaluates device-level fraud detection signals received from the client device 110, e.g., from the trusted program 114, and determines a level of trustworthiness (or integrity) of the client device 110 based on the device-level fraud detection signals. The device-level fraud detection signals can include data representing operating characteristics or metrics of the client device that can be used to determine whether a client device is compromised or whether the client device is operating as a normal client device or an emulated client device. Certain operating characteristics and metrics are often different for genuine client devices relative to emulators. In some implementations, the device-level fraud detection signals include application-level fraud detection signals that include operating characteristics and metrics of the application 111 requesting trust tokens. The trusted program 114 can collect these device-level fraud detection signals and include the signals in the request for trust tokens.

The device integrity system 170 can issue a verdict that indicates the level of trustworthiness (or integrity) of the client device 110. The recipients use the verdict to determine whether to trust a request 120 that includes the verdict. For example, if the verdict indicates that the client device 110 is not trustworthy, the recipient can ignore the request, e.g., not respond to the request.

Figure 2:
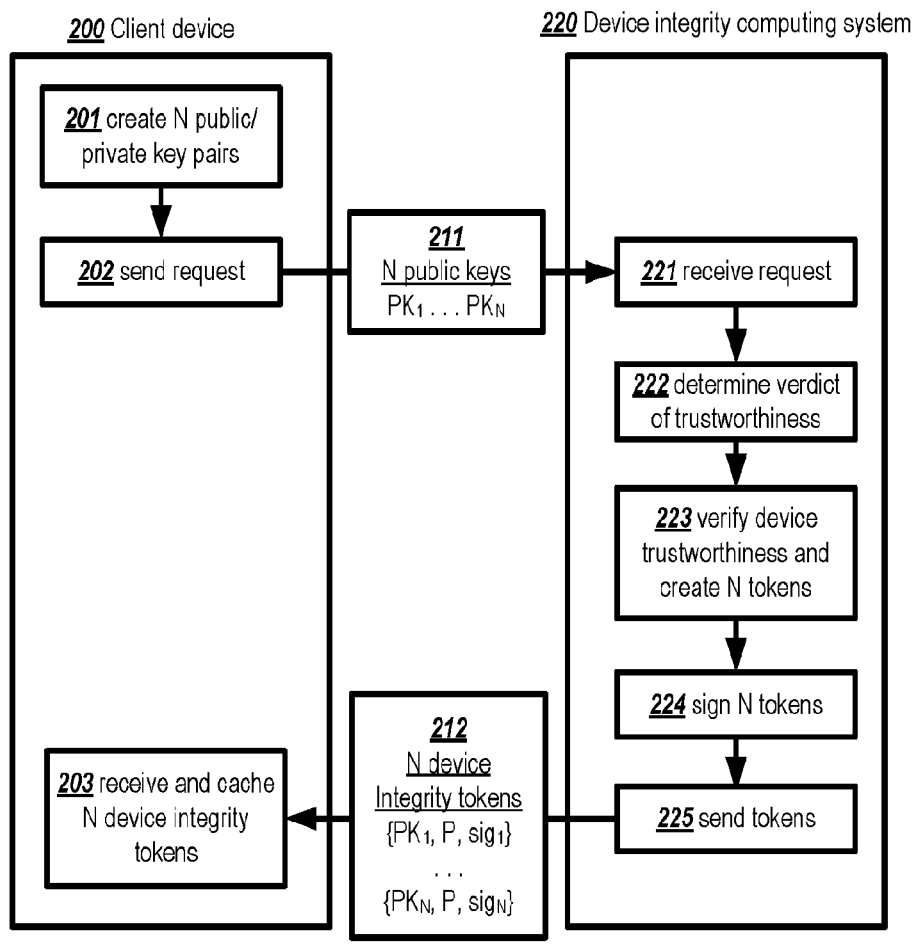
FIG. 2 is a flow diagram that illustrates an example process for requesting and receiving a batch of N device integrity tokens.
Figure 3:
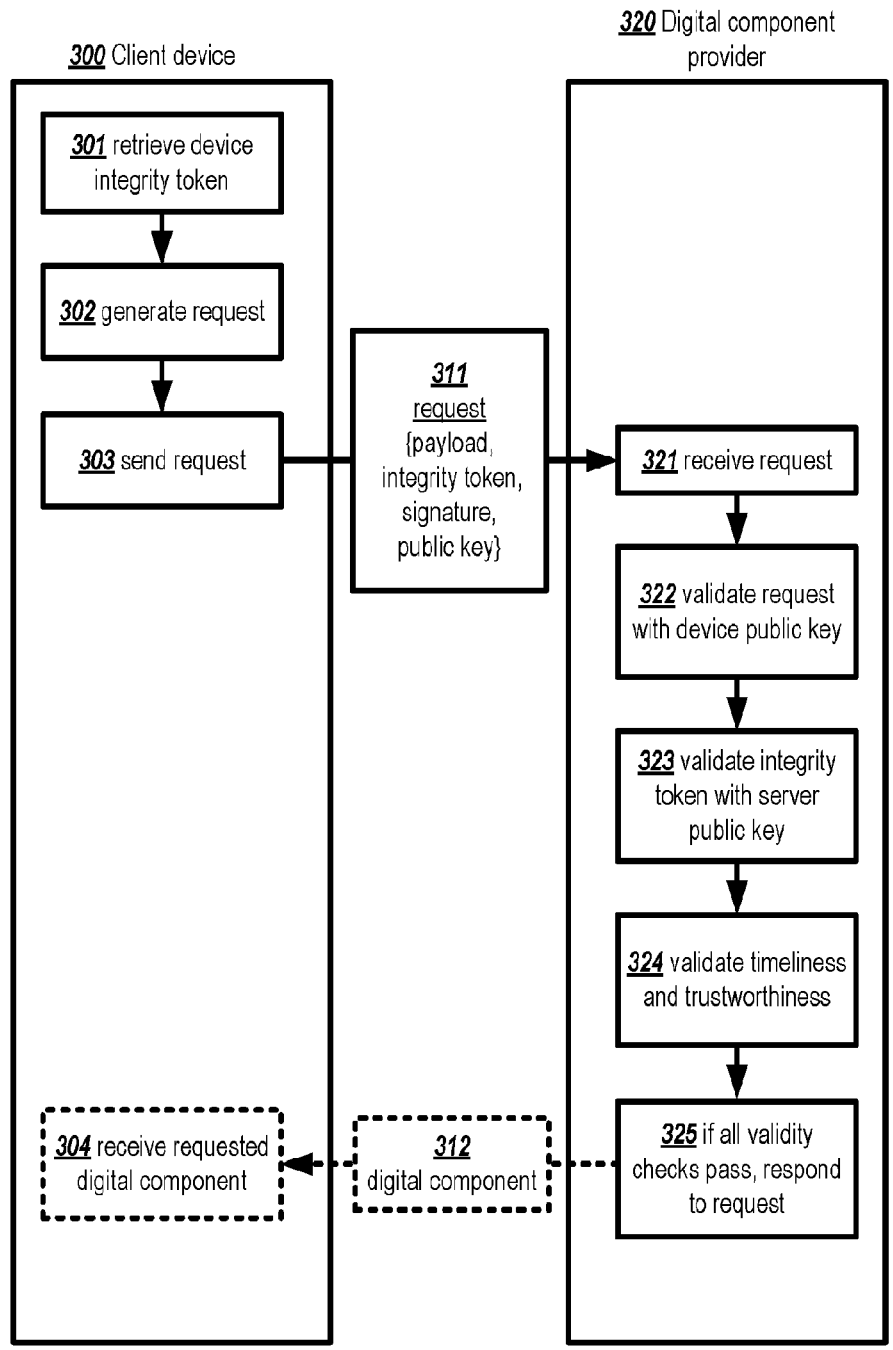
FIG. 3 is a flow diagram that illustrates an example process for sending, receiving, and validating an attestation token.

As discussed above, in some approaches, the device private/public key pair (and the device integrity token associated with the device public key) can be varied across multiple attestation tokens, to enhance privacy of the client device or user against tracking by attestation token recipients. For example, the client device can generate batches of private/public key pairs and retrieve corresponding batches of device integrity tokens from a device integrity server, so that the reuse of device integrity tokens is reduced or eliminated. An illustrative example of this batch process is depicted in FIG. 2.

In this example, a client device 200 creates a number N public/private key pairs (201). For example, a trusted program of the client device 200 can generate the public/private key pairs. The public/private key pairs can be asymmetric key pairs. Each public/private key pair includes a private key and a public key that correspond to, and is mathematically linked to, the private key. Data that is digitally signed using a private key can only be verified using the corresponding public key. Similarly, data that is encrypted using the public key can only be decrypted using the corresponding private key.

The client device 200 sends a request to a device integrity computing system 220 for N device integrity elements (202). The number N can be an integer that is greater than or equal to two. In this example, the device integrity elements are device integrity tokens and the request is for N device integrity tokens corresponding to the N public/private key pairs. The trusted program can determine the number N of device integrity tokens to request based on a frequency at which the trusted program uses unique device integrity tokens in requests. The client device can generate a public/private key pair for each requested device integrity token and include public key data in the request. In this example, the public key data can be the public keys themselves. The request thus involves passing N public keys 211 of the client device 200 to the device integrity server 220. In this example, the N public keys 211 include the actual public keys, e.g., the raw data of the N public keys 211. The request can also include device-level fraud detection signals. For example, the trusted program can collect the device-level fraud detection signals and include the signals in the request.

The device integrity computing system 220 receives the request (221). Based upon the device-level fraud detection signals received from the client device, the device integrity computing system 220 determines a level of trustworthiness of the client device (222). For example, the device integrity computing system might have M possible levels of trustworthiness that each correspond to a respective verdict. In this example, the device integrity computing system 220 can select one of these M possible levels of trustworthiness based upon the device-level fraud detection signals, as described above.

The device integrity computing system 220 generates N device integrity elements (223). In this example, each device integrity element is in the form of a device integrity token. That is, the device integrity computing system 220 generates a respective device integrity token for each received public key.

Each device integrity token can include the trustworthiness verdict, a timestamp for the verdict of trustworthiness, and one of the N public keys 211 of the client device 200. The timestamp indicates the time at which the device integrity token is generated. The device integrity system can generate each device integrity token based on one of the N public keys 211. For example, the device integrity system 220 can assemble a set of data that includes the public key of the client device 200, the trustworthiness verdict, and the timestamp. In some approaches, where the verdict of trustworthiness includes just two possible verdicts (trustworthy and untrustworthy), the verdict of trustworthiness can be omitted from the device integrity token. In other words, in these approaches, the device integrity system can generate device integrity tokens for devices that are trustworthy (with those tokens omitting the implied verdict of trustworthiness) and simply decline to generate device integrity tokens for devices that are untrustworthy.

The device integrity computing system 220 digitally signs each of the N device integrity tokens (224). For example, the device integrity computing system 220 can generate a digital signature using a private key of the device integrity system and based on the other data of the device integrity token (e.g., the trustworthiness verdict, the public key of the client device 200, and the timestamp).

The device integrity computing system 220 transmits the N device integrity tokens to the client device (225). The client device 200 receives and stores the batch of device integrity tokens for later use (203). The client device 200 can store the device integrity tokens locally, e.g., in a cache or secure storage maintained by the trusted program. Each cached device integrity token can include, for example: (1) the verdict of trustworthiness as determined by the device integrity computing system 220; (2) a timestamp for the creation of the device integrity token; (3) a public key of the client device; and (4) a digital signature of the token components, signed using a private key of the device integrity computing system 220.

Having obtained a batch of device integrity tokens, as illustrated in the example of FIG. 2, the client device can use the device integrity tokens to assemble and send attestation tokens as part of various requests heading toward digital component providers or other attestation token recipients, as discussed above. An illustrative example of such a request is depicted as a process flow diagram in FIG. 3.

To prepare a request, a client device 300 can retrieve a device integrity token from local storage of the client device (301). In various approaches, the client device 300 can, for example, (1) use a new device integrity token for each request; or (2) use the same device integrity token for a selected interval of time (e.g., H consecutive hours) and when that interval lapses use a different device integrity token; or (3) use the same device integrity token for all requests originated from the same application or website (e.g., where a different device integrity token is used for each application or website); or (4) use a combination of two or more of these token reuse approaches (e.g., using the same device integrity token for all requests originated from the same application or website within a selected interval of time). Thus, the client device 300 can retrieve a device integrity token based on the application or website for which the request is generated or the current time at which the request is generated.

The client device 300 can generate a request (302). The request 311 can include, for example, payload data (as discussed above), a request creation timestamp, the retrieved device integrity token, the device public key that corresponds to the device integrity token, and a digital signature of the request components. A trusted program of the client device, or a trusted component of an operating system of the client device, can generate request 311, which can include or be in the form of an attestation token, by accessing the payload data and the device integrity token. The trusted program can also determine, as the request creation timestamp, a current time. The trusted program can generate a digital signature of the payload data, the public key and the timestamp using a private key of the client device (e.g., the private key corresponding to the device the public key included in the request). In some approaches, as a simple optimization to reduce attestation token size, the attestation token omits the device public key, because the device public key is already present in the device integrity token that is included as a component of the attestation token.

The client device 300 sends the request 311 to a computing system 320 of a recipient (303). In this example, the recipient is a digital component provider. For example, the client device 300 can send the request 311 to a digital component distribution system and the digital component distribution system can send the request to one or more digital component providers.

The recipient computing system 320 receives the request (321). The recipient computing system 320 validates the request (322). For example, the recipient computing system 320 can validate the request by verifying the digital signature of the request using the device public key included in the request. The recipient computing system 320 can attempt to verify the digital signature using the public key and the content of the request signed over by the client device 300, e.g., the payload data, the timestamp, the public key, and the device integrity token. If any of this content changed after the digital signature was generated, the verification would fail. For example, if a malicious party inserted the device integrity token into another request or inserted a different device integrity token that had a higher verdict of trustworthiness into the request, the signature verification would fail. This ensures that the content of the request was not changed during transmission of the request, e.g., by an intermediary.

The recipient computing system 320 validates the device integrity token (323). For example, the recipient computing system 320 can validate the device integrity token by verifying the signature of the device integrity token using the public key of the device integrity computing system. This similarly ensures that the content of the device integrity token has not changed since the device integrity token was issued by the device integrity token computing system. If the attestation token includes the device public key, the validation of the device integrity token can also include a confirmation that the device public key included with the attestation token matches the device public key that is included within the device integrity token.

The recipient computing system 320 validates the timeliness of the device integrity token and trustworthiness of the client device (324), e.g. to confirm that the device integrity token was recently created (i.e. not created more than a selected interval of time such as H hours or D days before the time when the request was made, for H, D=1, 2, 3, . . . ) and to confirm that the trustworthiness verdict in the device integrity token is a verdict sufficient to honor the request.

If all of these validity checks pass, the recipient computing system 320 can respond to the request (325), e.g. to change settings, add or remove user data, deliver a digital component, etc. as discussed above. If any of the validity checks fail, the recipient computing system 320 can ignore the request. For example, the recipient computing system 320 may not respond to the request, may not perform the operation requested, etc.

For requests that involve delivering a digital component, the responding 325 can include optionally sending an appropriate digital component 312. For example, the recipient computing system 320 can select a digital component based on the payload of the request and send the digital component to a digital component distribution system that sent the request to the digital component provider. In turn, the digital component distribution system can send the digital component to the client device 300. The client device 300 can receive the digital component (304). In turn, the client device 300 can present the digital component.

Figure 4:
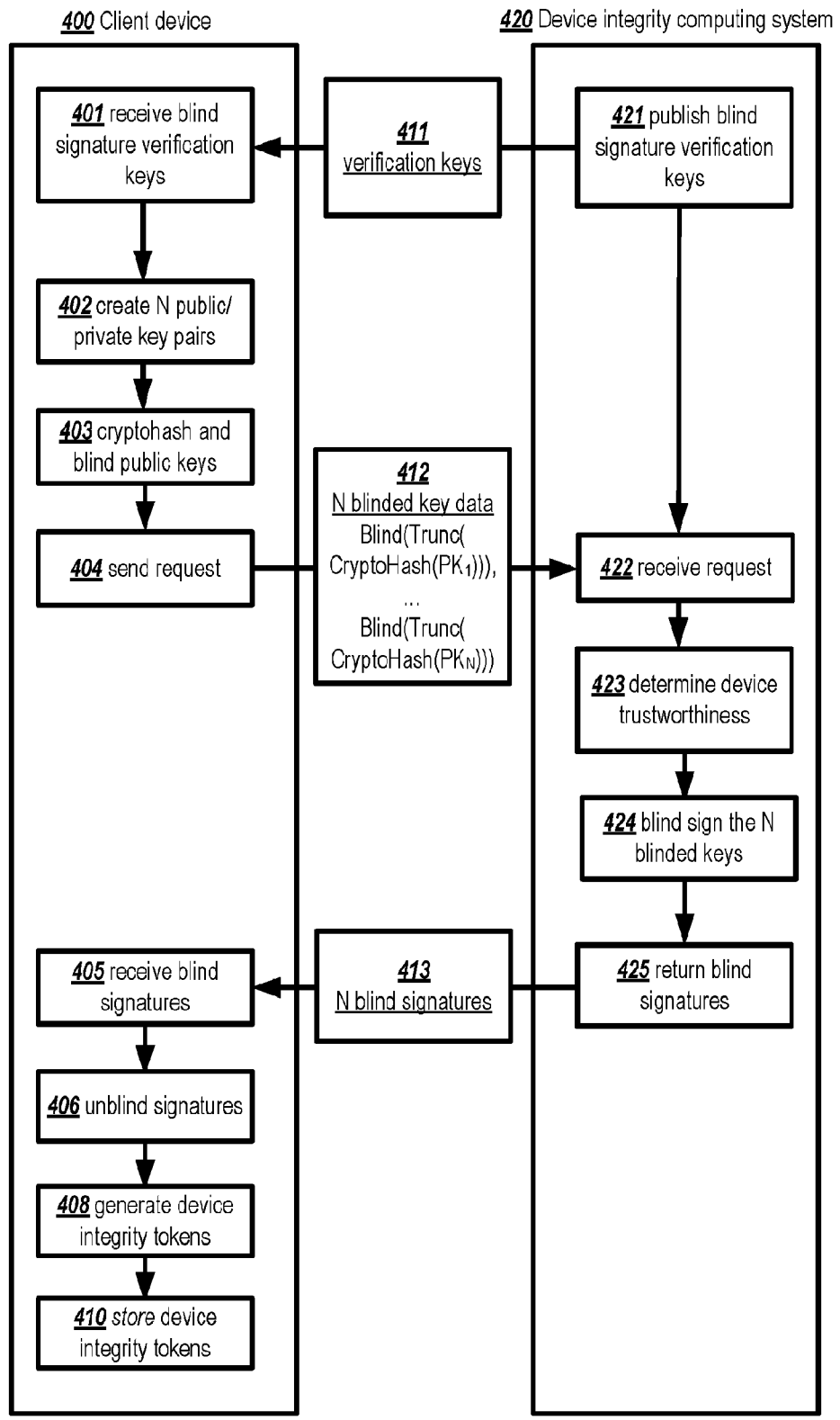
FIG. 4 is a flow diagram that illustrates an example process for requesting and receiving a batch of N blind-signed device integrity tokens.
Figure 5:
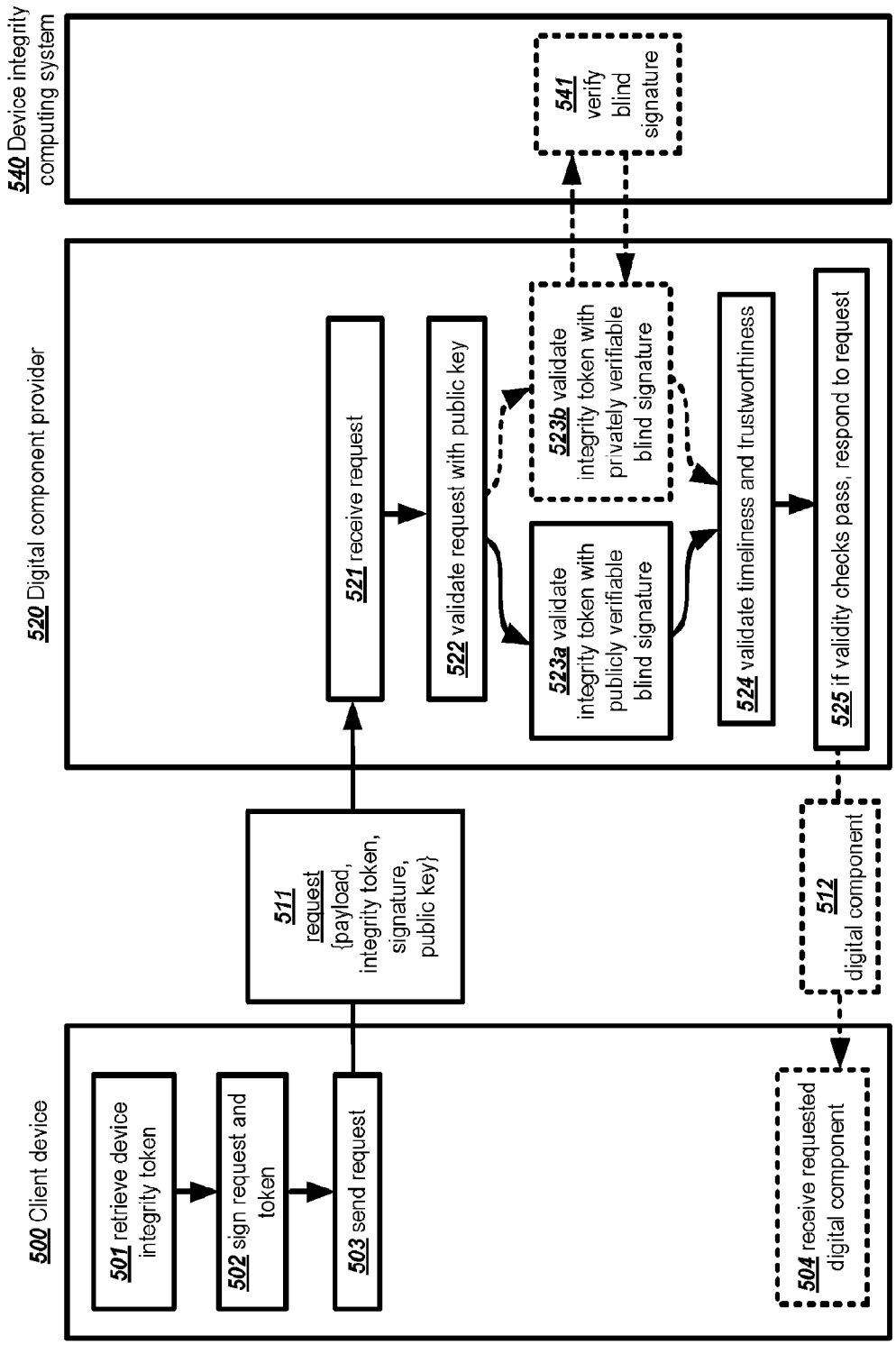
FIG. 5 is a flow diagram that illustrates an example process for sending, receiving, and validating a blind-signed attestation token.

As discussed above, in some approaches, a blind signature scheme may be used in the process to generate the device integrity tokens, so that the device integrity computing system does not see the raw data of the public keys of the client device. For example, the client device can generate batches of private/public key pairs, and then blind the public keys (or suitable derivatives of these public keys that can be used as values for the commit phase of the blind signature scheme, such as cryptohashes of the public keys, or cryptohashes of the public keys concatenated with a device model number) using a blind signature scheme before sending the public keys to a device integrity system to retrieve corresponding batches of device integrity elements. In this example, the device integrity elements are blind signatures of the blinded public keys. An illustrative example of this batch process is depicted in FIG. 4.

In this example, the device integrity computing system 420 can define M different levels of trustworthiness for client devices, and publish M different blind signature verification keys 411 for the corresponding M levels of trustworthiness (421). For example, the M levels can include two levels, trustworthy and untrustworthy. In another example, the M levels can include three levels, suspicious, satisfactory, and trusted. In other example, the M levels can include four levels, fraudulent, suspicious, satisfactory, and trusted. Other quantities of levels can also be used. Therefore, M can be an integer that is greater than or equal to two. In some approaches, instead of assigning a blind signature verification key for the lowest level of trustworthiness (e.g. an "untrustworthy" or "fraudulent" level of trustworthiness), the lowest level of trustworthiness can be omitted from the M levels of trustworthiness, and the device integrity computing system can simply decline to provide blind signatures for devices with the lowest level of trustworthiness. Therefore, in these approaches, M can be an integer greater than or equal to one.

The device integrity computing system 420 can generate a respective blind signature verification key 411 for each level of trustworthiness using a blind signature scheme. The blind signature scheme can be a privately verifiable blind signature scheme, such as the Internet Engineering Task Force (IETF) Verifiable Oblivious Pseudorandom Functions (VOPRF) blind signature scheme. In other approaches, the blind signature scheme can be a publicly verifiable blind signature scheme, such as a Rivest-Shamir-Adleman (RSA) blind signature scheme.

The device integrity computing system 420 can publish the blind signature verification keys 411 such that the client devices, including the client device 400, can obtain the blind signature verification keys 411. For example, the device integrity computing system 420 can publish the blind signature verification keys 411 to a website or mobile app store.

The client device 400 can receive these blind signature verification keys (401). For example, the client device 400 can download the blind signature verification keys 411 and store the blind signature verification keys 411 locally, e.g., in secure storage or a cache. The client device 400 can retain the blind signature verification keys 411 to verify blind signatures later received from the device integrity computing system 420, as further discussed below. In some approaches, the device integrity computing system 420 can periodically publish new blind signature verification keys 411 (e.g. every hour, day, week, or other appropriate time period) and this refreshing of the set of blind signature verification keys can be used to validate the timeliness of device integrity tokens, as further described below.

To obtain a batch of N device integrity tokens, the client device 400 creates N public/private key pairs (402). For example, a trusted program of the client device can create a respective asymmetric public/private key pair for each device integrity token.

The client device 400 blinds the each public key or a derivative of each public key according to the blind signature scheme used to generate the blind signature verification keys (403). That is, the client device 400 blinds public key data for each public key, where the public key data is either the public key or a derivative of the public key. Blinding a public key can include obscuring the raw value of the public key by applying a blinding factor to the raw value of the public key. In this way, the device integrity computing system 420 cannot access the raw value of the public keys received from the client device 400 and use those values to track the user or client device 400, e.g., using data received from another entity that received the raw value of the public key with additional data.

To reduce the volume of data that needs to be blind-signed by the device integrity computing system 420, instead of blinding each entire device public key, the client device 400 (e.g., its trusted program) may generate a derivative of the public key and blind the derivative of the public key. The derivative can be a cryptohash of the public key. For example, the client device 400 can generate a cryptohash of each public key using a cryptohash function and then blind the cryptohash of the public key using the blind signature scheme. In some implementations, the cryptohash algorithm can be SHA256.

In some implementations, the client device 420 can further reduce the data size of the blinded public key data by truncating the cryptohash, and then blind the truncated cryptohash. For example, this truncation can limit the cryptohash to 16-bytes from an original cryptohash having a larger data size. This truncation results in a shorter cryptohash that the client device 400 blinds using the blind signature scheme.

Reducing the volume of data that is blindly signed in this way reduces the burden placed on the device integrity computing system 420 (e.g., reduces CPU cycles, data storage requirements, memory consumption etc.) in blindly signing the data, which allows the device integrity computing system 420 to generate the blind signatures faster, more efficiently, and handle more requests than if blinded versions of the full public keys were provided. This also reduces bandwidth consumption of the network over which the requests are sent and enables a large amount of blinded public key data to be sent in a single request.

The client device 400 sends a request 412 to the device integrity computing system 420 for N device integrity tokens (404). The number N can be an integer that is greater than or equal to two. The request can include blinded public key data for each public key 411 generated by the client device 400. For example, the request can include N blinded public keys, N blinded cryptohashes of public keys, or N blinded truncated cryptohashes of public keys. The request can also include device-level fraud detection signals, e.g., that are collected by the trusted program of the client device 400.

The device integrity computing system 420 receives the request (422). The device integrity computing system 420 determines a verdict of trustworthiness of the client device 400 based on the device-level fraud detection signals (423). For example, the device integrity computing system 400 can have M possible verdicts of trustworthiness (corresponding to the M blind signature verification keys published in operation 421). The device integrity computing system 420 can assign the client device 400 to one of the M possible verdicts based on the device-level fraud detection signals.

Having determined a verdict of trustworthiness of the client device 400, the device integrity computing system 400 signs each piece of blinded public key data (e.g., each N blinded public key or each blinded cryptohash) using a blind signing private key (424). For example, the device integrity computing system 420 can obtain the blind signing private key that corresponds to the verdict of trustworthiness determined for the client device 400, e.g., the blind signing private key corresponding to the public blind signature verification key for the determined verdict of trustworthiness (424). Using the blind signing scheme in this way, the device integrity computing system 420 can generate a digital signature of the blinded public key data without knowing the actual value of the public key data.

The device integrity computing system 420 returns the N blind signatures 413 to the client device (425). The client device 400 receives the blind signatures from the device integrity computing system (405).

The client device 400 unblinds the blind signatures using the blind signature scheme (406). For example, the trusted program of the client device 400 can validate each blind signature using the blinded public key data for which the blind signature was generated and a blind signature verification key published by the device integrity computing system 420. To do this, the trusted program can attempt to validate the blind signature using multiple blind signature verification keys, e.g., for each verdict of trustworthiness. If the verdict does not match the verdict assigned to the client device 400, the blind signature would not be validated using the blind signature verification key for that verdict. The trusted program can determine the assigned verdict of trustworthiness of the client device 400 based on the blind signature verification key that successfully validates the blind signature—e.g., the verdict of trustworthiness corresponding to the blind verification key is the verdict assigned to the client device 400. If validated, the trusted program can then unblind the blind signature using the blind signature scheme.

The client device 400 generates a batch of device integrity tokens (408). For example, the trusted program of the client device 400 can generate a device integrity token for each public key generated in operation 402 above. Each device integrity token can include, for example: (1) the public key of the client device for which the device integrity token is being generated; (2) the verdict of trustworthiness as determined by the device integrity computing system; and (3) the unblinded blind signature of the blinded public key or the cryptohash (e.g., truncated) of the public key. In some approaches, the device integrity token can omit the verdict of trustworthiness, as this can be implied from the unblinded blind signature. If the blind signature is not publicly verifiable, then when the device integrity computing system is called upon to verify the blind signature (see, e.g., 541 in FIG. 5 as discussed below), the device integrity computing system can also return the verdict. If the blind signature is publicly verifiable, then the public key that verifies the blind signature also implies the verdict of trustworthiness of the device.

The client device 400 stores the device integrity tokens (410). For example, the trusted program of the client device 400 can store the device integrity tokens in secure storage for later use when sending requests that should include a device integrity token. The secure storage can be a token cache of the client device 400.

Having generate and stored a batch of device integrity tokens, as illustrated in the example of FIG. 4, the client device can use the device integrity tokens to assemble and send attestation tokens as part of various requests made for digital component providers or other attestation token recipients, as discussed above. An illustrative example of such a request is depicted as a process flow diagram in FIG. 5.

To prepare a request, the client device 500 can retrieve a device integrity token, e.g., from a token cache of the client device (501). In various approaches, the client can, for example, (1) use a new device integrity token for each request; or (2) use the same device integrity token for a selected interval of time (e.g. H consecutive hours); or (3) use the same device integrity token for all requests originated from the same application or website; or (4) use a combination of these token reuse approaches (e.g., using the same device integrity token for all requests originated from the same application or website within a selected interval of time). Thus, the client device 500 can retrieve a device integrity token based on the application or website for which the request is generated or the current time at which the request is generated.

The client device 500 can assemble a request 511 that includes set of content that includes a request payload (as described above), a request creation timestamp that indicates a time at which the request is generated, the device integrity token, and a device public key that corresponds to the device integrity token (e.g., the public key for which public key data was blindly signed and that is included in the device integrity token along with the unblinded blind signature). The request can also include a digital signature of the set of content, signed (502) using a private key of the client device (e.g., the private key corresponding to the public key included in the request). For example, the trusted program of the client device 500 can generate the digital signature based on the set of content using the private key. The request can include or be in the form of an attestation token. For example, the attestation token can include the set of content (e.g., with an attestation token creation timestamp) and the digital signature.

The client device 500 sends the request 511 to a computing system 520 of a recipient (503). If the recipient is a digital component provider, the client device 500 can transmit the request to a digital component distribution system that, in turn, forwards the request to appropriate digital component providers.

The recipient computing system 520 validates the request (522). The recipient computing system 520 can validate the request by verifying the digital signature of the request using the device public key included with the request. The recipient computing system 520 can also validate that the request by comparing the timestamp in the request to the time at which the request was received. If the signature is validated successfully and the timestamp is within a threshold duration of the current time, the client device 500 can deem the request as being validated.

The recipient computing system 520 also validates the device integrity token. This validation process can differ based on the blind signature scheme used by the device integrity computing system 540 when generating the blind signatures. If the blind signature scheme is a publicly verifiable scheme (e.g., RSA), the recipient computing system 520 can validate the device integrity token without invoking the device integrity computing system (523a). In this example, the recipient computing system 520 can use the blind signature scheme to verify the unblinded blind signature of the public key data included in the device integrity token. If a cryptohash of the public key is used, the recipient computing system 520 can generate the cryptohash of the public key included in the request (and truncate it if appropriate) using the same cryptohash function as the client device 500 and use the blind signature scheme to verify the unblinded blind signature of the cryptohash.

If the blind signature scheme is a private verifiable scheme (e.g., IETF VOPRF), the recipient computing system 520 can invoke the device integrity computing system 540 to verify the unblinded blind signature (523b). In this example, the recipient computing system 520 can send the unblinded blind signature and the public key or the cryptohash of the public key to the device integrity computing system 540.

The device integrity computing system 540 can attempt to verify the unblinded blind signature using the blind signature scheme and provide a response to the digital component provider (541). The response can indicate whether the verification was successful or not, and the trustworthiness of the client device corresponding to the blind signature verification key that verifies the unblinded blind signature.

The recipient computing system 520 validates the timeliness of the device integrity token and the trustworthiness of the client device (524), e.g. to confirm that the device integrity token was recently created and to confirm that the trustworthiness verdict in the device integrity token is a verdict sufficient to honor the request. Because the device integrity computing system 540 may periodically republish new blind signature verification keys, the timeliness validation can include confirming that that the blind signature of the device integrity token is not signed with an invalid stale key, for example by determining that the device integrity token was verified with a blind signature verification key that has expired. In one approach, the recipient computing system can determine that the blind signature verification key has expired because an effective date of the blind signature verification key was encoded as part of the URL for the published key. In another approach, the recipient computing system can determine that the blind signature verification key has expired because the verification key is published with metadata encoding the expiration date of the verification key.

If all of these validity checks pass, the recipient computing system 520 can respond to the request (525), e.g. to change settings, add or remove user data, deliver a digital component, etc. as discussed above. For requests that involve delivering a digital component, the responding 525 can thus include optionally sending the appropriate digital component 512 to the client device 500. In this example, the client device 500 can present the digital component. If any of the validity checks fail, the recipient computing system 520 can ignore the request, e.g., elect to not send a response to the request, update settings, etc.

While the approaches illustrated in the examples of FIGS. 2-5 and described above involve using device public keys of the client device, other approaches may forgo the use of device public keys in favor of a group signature scheme. Generally speaking, a group signature scheme is a method for allowing a member of a group to anonymously sign a message on behalf of a group. In a group signature scheme, a group manager publishes a group signature function sign (message,C) which can be used to sign a message with a certificate C, where certificate C is an confidential certificate (also known as an anonymous private key) that has been privately issued by the group manager to a member of the group. The group manager also publishes a group verification key K (also known as a group public key) and group signature verification function verify(sign(message,C), K) which returns TRUE if and only if the message was signed with the group signature function using the anonymous certificate C and K is the group verification key for C.

These techniques can employ a group signature scheme for attestation of client device requests, with a device integrity system as group manager. While some group signature schemes allow the group manager to de-anonymize an anonymous signature created by a member of the group, privacy considerations may favor a group signature scheme that does not include this de-anonymization capability, such as Direct Anonymous Attestation (DAA). For example, in some approaches, the device integrity system can use an elliptic curve cryptographic (ECC) DAA scheme, such as ECC DAA with Barreto-Naehrig curves. Moreover, while some group signature schemes may allow the group manager to revoke group memberships, efficiency considerations may favor a group signature scheme that does not include this revocation capability, so that the techniques are scalable to Internet scale, e.g. having groups with millions or billions of group members.

Figure 6:
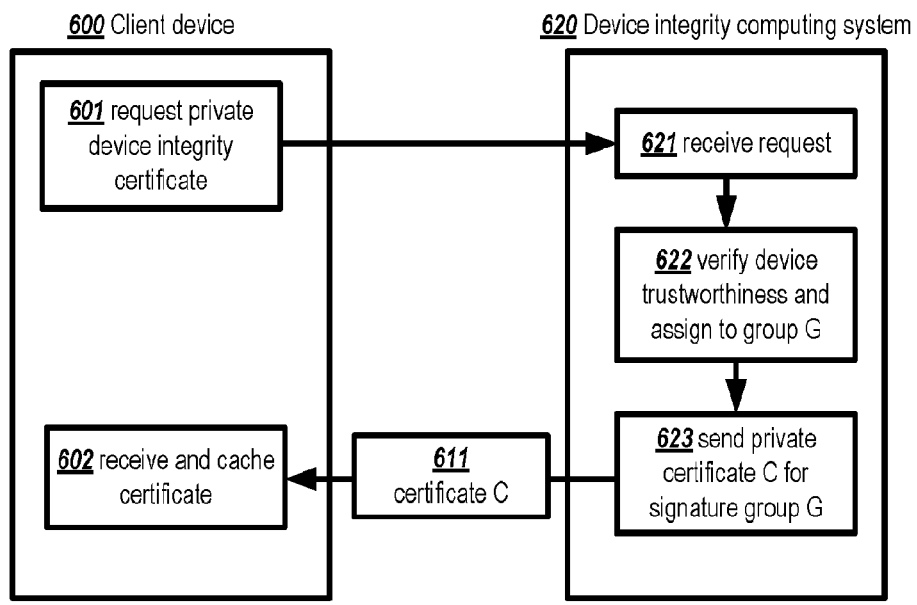
FIG. 6 is a flow diagram that illustrates an example process for requesting an anonymous private key for a signature group.
Figure 7:
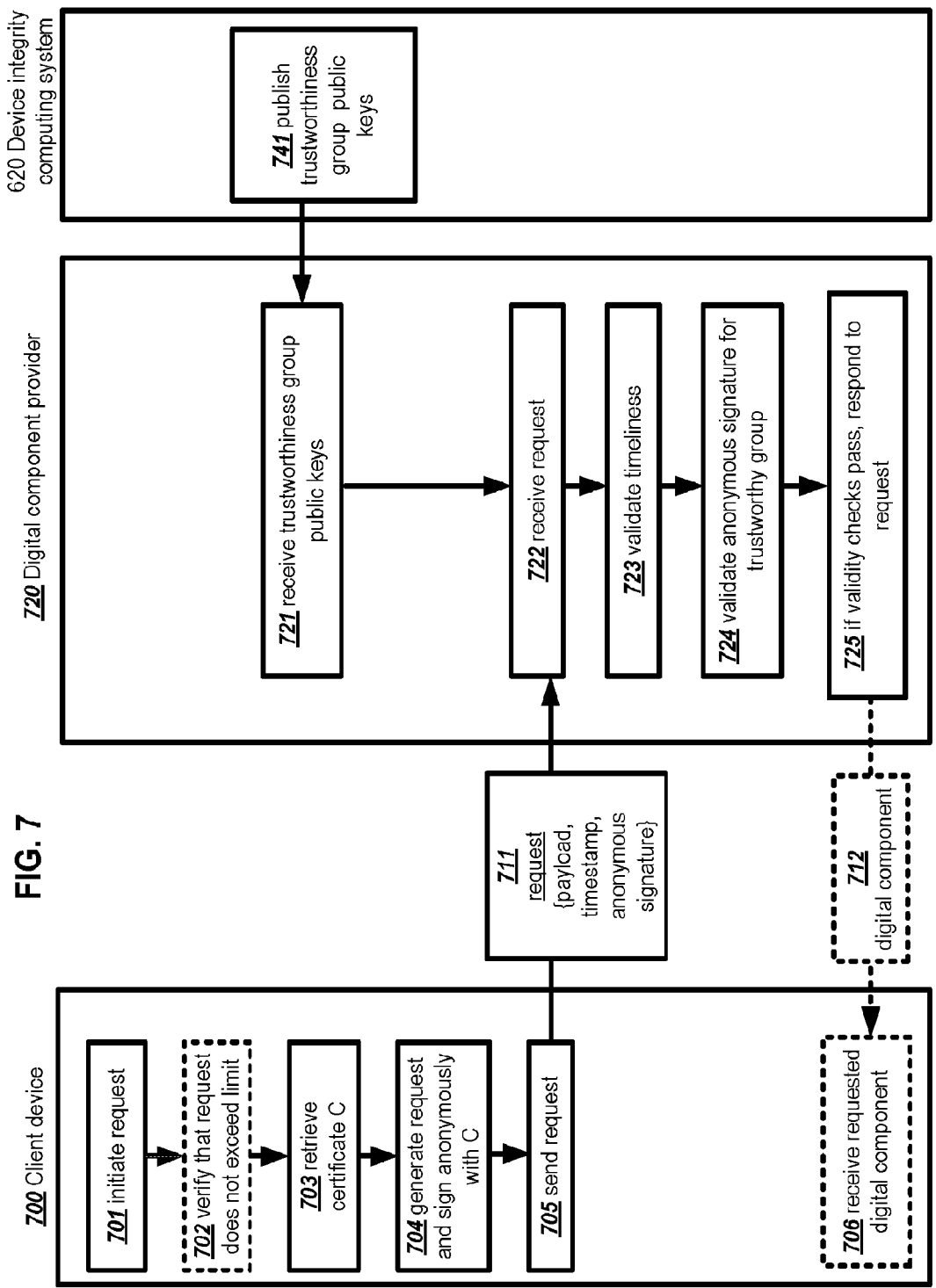
FIG. 7 is a flow diagram that illustrates an example process for sending, receiving, and validating an anonymously-signed attestation token.

An illustrative example of a group signature scheme for attestation of client device requests is depicted in the process flow diagrams of FIGS. 6 and 7. In this example, a device integrity computing system 620 can define M different levels of trustworthiness for client devices and publish M different group verification keys for the corresponding M levels of trustworthiness. For example, the device integrity system can publish one, two, or more group verification keys, e.g., ECC DAA verification keys corresponding to levels of device trustworthiness. For approaches where M=1, the group verification key corresponds to some minimum level of trustworthiness, and devices not meeting that minimum level of trustworthiness will not be joined as members of the trustworthiness group. For approaches where M≥2, the different group verification keys correspond to respective levels or classifications of device trustworthiness. In some approaches, the device integrity computing system can periodically publish new group verification keys (e.g., every hour, day, week, or other period of time as appropriate) and this refreshing of the set of group verification keys may be used to validate the timeliness of client device requests, as further described below.

Referring now to FIG. 6, a client device 600 can request a private device integrity certificate in the form of a confidential certificate for one of the M trustworthiness groups that are managed by the device integrity server 620 (601). The request can include device-level fraud detection signals, e.g., collected by a trusted program of the client device 600.

The device integrity computing system receives the request (621). The device integrity computing system 620 can determine a verdict of trustworthiness of the client device based on the device-level fraud detection signals and assign the client device to a selected trustworthiness group corresponding to the verdict of trustworthiness (622).

The device integrity computing system 620 can then generate or select an anonymous certificate 611 corresponding to the selected trustworthiness group and return the anonymous certificate 611 to the client device (623). For example, the device integrity computing system can generate a credential corresponding to an ECC DAA verification key associated with the device trustworthiness level assigned to the device by the device integrity computing system. The client device 620 can receive the anonymous certificate 611 and securely store it locally at the client device 620, e.g., in a private keystore (602). For example, the client device can encrypt the certificate using a master key for a private keystore, so that malicious parties cannot misappropriate the certificate and use it on a different device.

Having obtained an anonymous certificate of membership in a particular trustworthiness group, the client device can use this anonymous certificate to assemble and send attestation tokens as parts of various requests made of digital component providers or other attestation token recipients. In this example, the attestation tokens can be referred to as anonymous attestation tokens as they do not include a public key of the client device. An illustrative example of such a request is depicted as a process flow diagram in FIG. 7.

The client device 700 can initiate the request (701) to be made of a digital component provider or other attestation token recipient. In some implementations, the client device can optionally confirm that the request does not exceed an attestation token limit (702), as further described below. The client device 700 retrieves the anonymous certificate (703), e.g., from a private keystore on the client device, having previously obtained the certificate from the device integrity computing system as described above and in FIG. 6.

The client device 700 generates a request 711 and signs that request with the retrieved anonymous certificate (704). The generating of the request can include, for example, generating a set of content that includes a request payload and a request creation timestamp. The request payload can include, for example, data that can be used to select a digital component, or data specifying a requested change to be made by the attestation token recipient, such as removal of data. The request creation timestamp can indicate the time at which the request is generated. In some instances, the request creation timestamp has a time resolution that is small enough to detect duplicated requests or replay attacks. For example, the request creation timestamp can have a time resolution less than about a millisecond, or less than about a microsecond. In approaches where the group signature scheme is a probabilistic group signature scheme, two separate signings of the same request 711 by the client device 700 will generate different signatures. In these approaches, recipients of the requests 711 can prevent duplicated requests or replay attacks by rejecting requests with identical signatures.

Contrary to other approaches described above and in FIGS. 3 and 5, the request 711 does not include a public key of the client device, nor does it include device integrity token (compare request 311 in FIG. 3 and request 511 in FIG. 5). These attestation token features of the previously described approaches are unnecessary with the group signature scheme of the present approach, in which the client device's possession and use of the anonymous certificate C signifies that the client device is a member of a trustworthiness group managed by the device integrity computing system. The client device signs the request 711 using the anonymous certificate C using the published group signature function sign(message,C). For example, the client device 700 can generate a digital signature of the set of content using the anonymous certificate C, e.g., the client device can sign the request using an ECC DAA signing scheme with the ECC DAA credential previously provided to the client device by the device integrity server.

The client device sends the request 711 to a computing system 720 of a recipient (705). If the recipient is a digital component provider, the client device 700 can transmit the request to a digital component distribution system that, in turn, forwards the request to appropriate digital component providers.

The recipient computing system 720 receives the request (722). Prior to receiving the request 711 from the client device 700, the recipient computing system 720 receives (721) a set of M different group verification keys for the M trustworthiness classes of the device integrity computing system. The device integrity computing system 740 publishes (741) these M group verification keys, and may periodically republish new group verification keys (e.g., every hour, day, week, or other period of time as appropriate), in which case the attestation token recipient will periodically receive new group verification keys with which to validate requests from client devices. In one approach, the group verification keys are published on a well-known path, using a well-known URL, so that any recipient computing system 720 can fetch the group verification keys using standard HTTP requests. The path can encode date/time information, or metadata that accompanies the group verification keys can encode key expiration dates, so that the recipient computing system can determine whether the keys are current, as further discussed below.

The recipient computing system 720 validates the timeliness of the request (723). For example, the recipient can review the request creation timestamp to confirm, among other things, that the request is not a duplicate (or replay attempt) and that the request is not stale (e.g., the difference between the request creation timestamp and the time when the recipient computing system receives the request within a threshold).

The recipient computing system 720 validates the anonymous signature and trustworthiness of the request (724). For example, the recipient can validate the anonymous signature by evaluating, for each published group verification key K in the set of M published group verification keys, the verification function verify(sign(message,C), K). The verification function can be, for example, an ECC DAA signature verification function that is computed using an ECC DAA verification key previously published by the device integrity server. If the function is FALSE for every published group verification key K, then the recipient can determine that the request was falsified or the client device 700 does not belong to any trustworthiness group. On the other hand, if the function is TRUE for a particular group verification key K, then the client device 700 belongs to the trustworthiness group corresponding to that particular group verification key K.

If these validity checks pass, the attestation token recipient can then respond to the request (725), e.g. to change settings, add or remove user data, deliver a digital component, etc., as discussed above. For requests that involve delivering a digital component, the responding 725 can then include optionally sending the appropriate digital component 712 to the client device 700. The client device 700 receives the digital component (706). In turn, the client device 700 can present the digital component to a user of the client device 700.

While the group signature approach illustrated in FIGS. 6 and 7 and described above enhances the privacy of the client device or user by preventing tracking based on device public keys of the client device, it may also prevent attestation token recipients (such as digital component providers) from identifying abusive devices or applications that may send unreasonable amounts of requests to the attestation token recipients. Accordingly, in some approaches, the client device may include a trusted throttler which can restrain the client device from sending excessive quantities of attestation tokens. Referring again to FIG. 7, the throttler may, for example, perform operation 702 of verifying that an initiated request does not exceed an attestation token limit before allowing the request to proceed. The throttler can be, for example, a thread, process, subroutine, or other component of a trusted operating system of the client device. While the throttler is described below in the context of the group signature approach of FIGS. 6-8, it is contemplated that a throttler may be used to limit the volume of attestation tokens in any of the attestation token contexts described herein. For example, the throttler may be used to limit the requests 311 of FIG. 3, or the requests 511 of FIG. 5.

Figure 8:
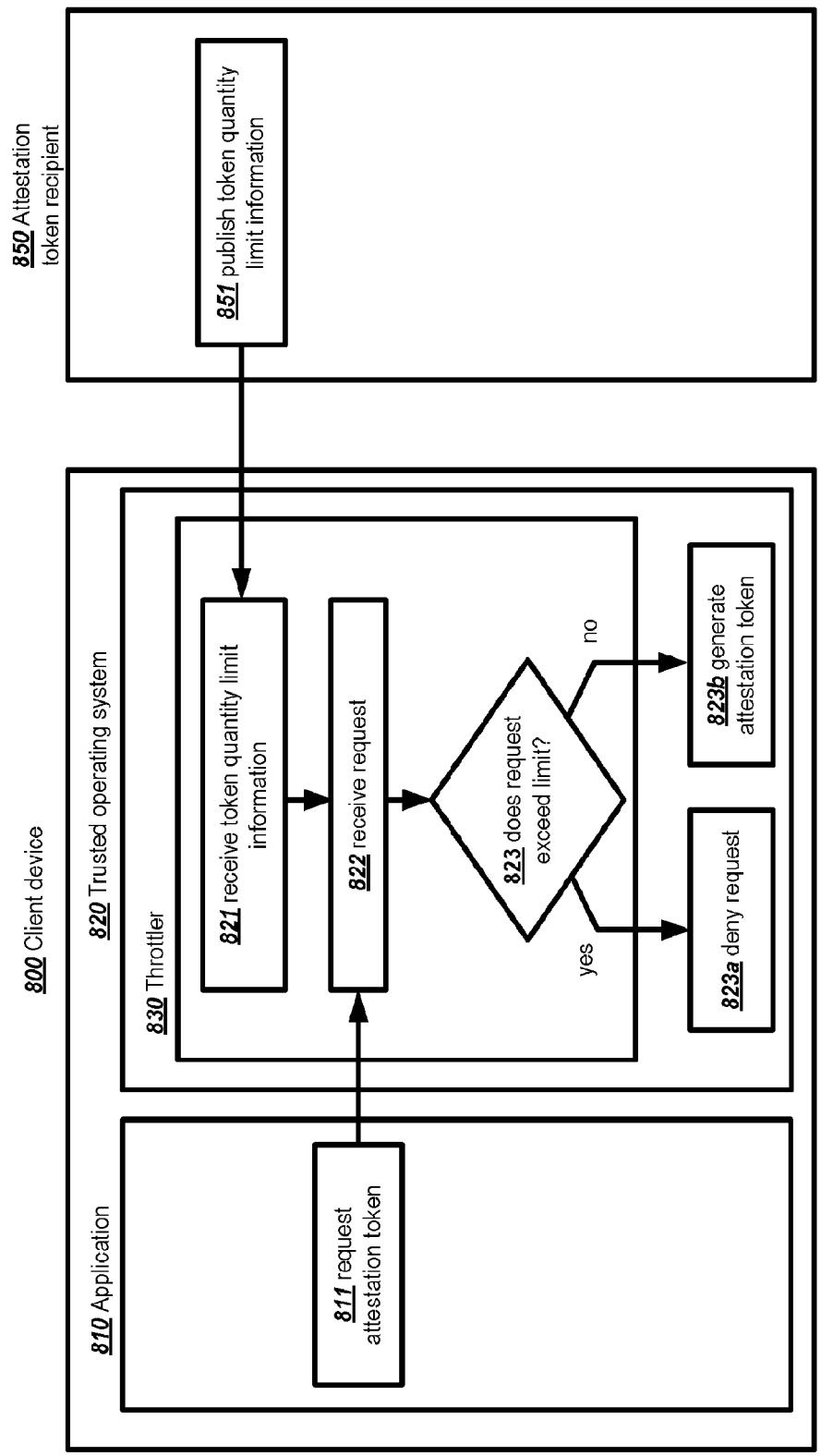
FIG. 8 is a flow diagram that illustrates an example process for throttling attestation tokens to comply with published token quantity limits.

An illustrative example of this throttling approach is depicted in process flow diagram in FIG. 8. Various attestation token recipients 850, such as digital component providers and other recipients of requests or other communications that include attestation tokens, can publish information indicating attestation token quantity limits (851). For example, an attestation token recipient can publish (1) a limit on the number of tokens that can be sent from each individual client device to a selected destination domain of the recipient within a selected time frame (e.g. no more than X requests within Y seconds, minutes, or hours); (2) a limit on the number of tokens that can be sent from one or more selected applications on an individual client device to a selected destination domain of the recipient within a selected time frame (e.g. no more than X requests from application A—or from any application other than application A—within Y seconds, minutes, or hours); (3) a limit on the number tokens that can be sent from an individual client device to a selected endpoint within a selected destination domain of the recipient within a selected time frame; (4) a limit on the number of tokens that can be sent from one or more selected applications on a client device to a selected endpoint within a selected destination domain within a selected time frame; or (5) any combination of two or more of such limits.

The throttler 830, as a component of a trusted program 820 (e.g., operating system) of the client device 800, receives the published token quantity limit information (821). The published token quantity limit information can be received in various ways. In one approach, each attestation token recipient publishes the token quantity information in a file, signed with a private key of the token recipient. A trusted crawler periodically fetches those files (together with the public keys for the token recipients) and delivers those files to each client device 800. The throttler 830 on each client device then honors the throttling requirements after verifying the signatures of the token recipients. For example, the throttler 830 can ensure that the limits are not exceeded by not generating attestation tokens for requests that would exceed a limit.

In another approach, each token recipient submits signed token quantity information to a digital distribution platform (such as a mobile app store from which mobile apps can be downloaded). The digital distribution platform verifies and signs the token quantity information. Each token recipient then delivers the twice-signed token quantity information to client devices 800. The throttler 830 on each client device then honors the throttling requirements after verifying the signatures of both the token recipients and the digital distribution platform. For example, the throttler 830 can ensure that the limits are not exceeded by not generating attestation tokens for requests that would exceed a limit.

When an application 810 on the client device initiates a request to the trusted program 820 for an attestation token (811), the trusted program 820 receives this request (822). The trusted program 820 can then invoke the throttler to evaluate whether honoring the request would cause the client device to exceed one or more of the published token quantity limits (823). If the request would exceed one or more of the published token quantity limits, then the trusted program 820 denies the attestation token request (step 823a). If the request would not exceed the published token quantity limits, then the trusted operating system 820 allows the attestation token to be generated and sent to the appropriate attestation token recipient (step 823b).

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent personalized content or communications from a server. In addition, certain data may be treated in one or more ways before it is stored or used, so that personally identifiable information is removed. For example, a user's identity may be treated so that no personally identifiable information (e.g., phone number, IMEI, device serial number) can be determined for the user, or a user's geographic location may be generalized where location information is obtained (such as to a city, ZIP code, or state level), so that a particular location of a user cannot be determined. Thus, the user may have control over what information is collected about the user, how that information is used, the information retention policy, and what information is provided to the user.

Figure 9:
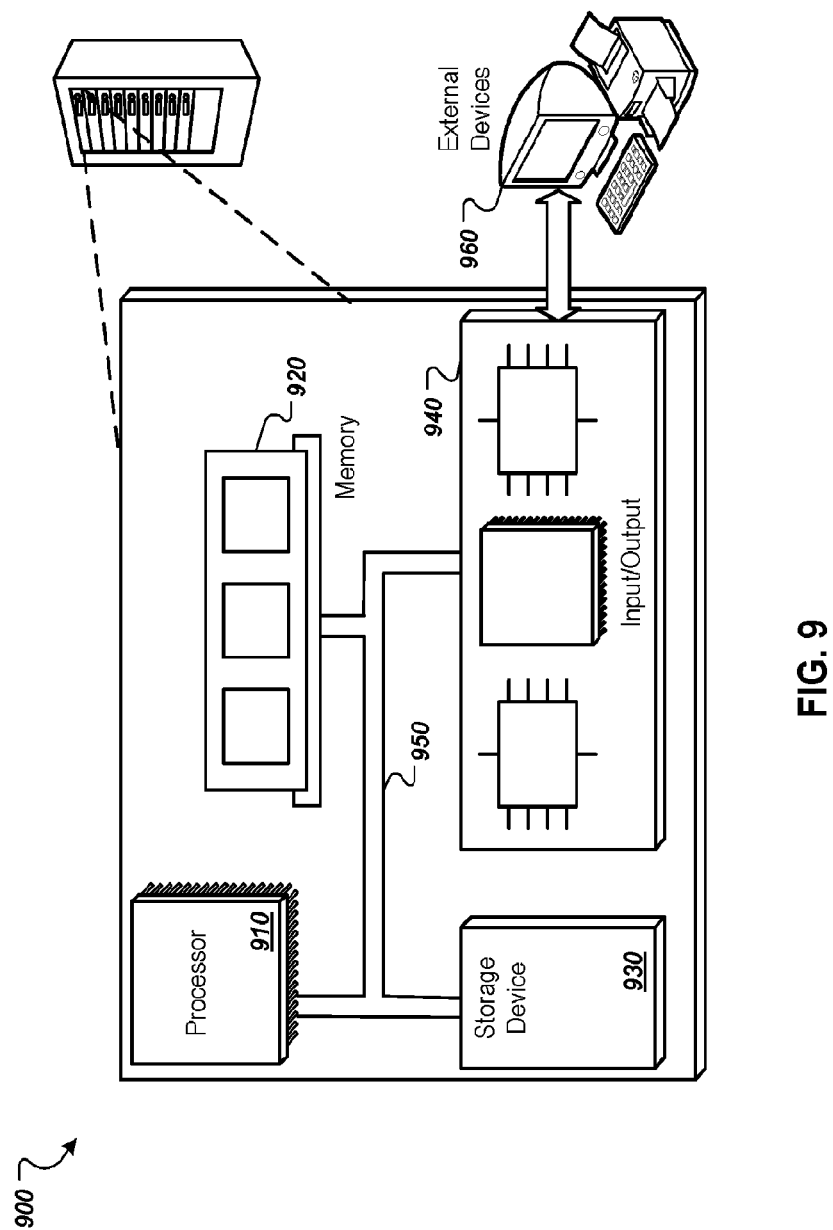
FIG. 9 is a block diagram of an example computer system.

FIG. 9 is a block diagram of an example computer system 900 that can be used to perform operations described above. The system 900 includes a processor 910, a memory 920, a storage device 930, and an input/output device 940. Each of the components 910, 920, 930, and 940 can be interconnected, for example, using a system bus 950. The processor 910 is capable of processing instructions for execution within the system 900. In some implementations, the processor 910 is a single-threaded processor. In another implementation, the processor 910 is a multi-threaded processor. The processor 910 is capable of processing instructions stored in the memory 920 or on the storage device 930.

The memory 920 stores information within the system 900. In one implementation, the memory 920 is a computer-readable medium. In some implementations, the memory 920 is a volatile memory unit. In another implementation, the memory 920 is a non-volatile memory unit.

The storage device 930 is capable of providing mass storage for the system 900. In some implementations, the storage device 930 is a computer-readable medium. In various different implementations, the storage device 930 can include, for example, a hard disk device, an optical disk device, a storage device that is shared over a network by multiple computing devices (e.g., a cloud storage device), or some other large capacity storage device.

The input/output device 940 provides input/output operations for the system 900. In some implementations, the input/output device 940 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 960, e.g., keyboard, printer and display devices. Other implementations, however, can also be used, such as mobile computing devices, mobile communication devices, set-top box television client devices, etc.

Although an example processing system has been described in FIG. 9, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a client device, comprising:
    transmitting, to a device integrity computing system, a first request for an anonymous certificate, the request including device-level fraud detection signals for the client device;
    receiving, from the device integrity computing system, the anonymous certificate, wherein the anonymous certificate corresponds to a given signature group selected from a set of device trustworthiness groups based at least on the device-level fraud detection signals, wherein each device trustworthiness group corresponds to a respective category of trustworthiness;
    creating an anonymous attestation token comprising (i) a set of data comprising a second request and an attestation token creation timestamp indicating a time of creation of the anonymous attestation token, and (ii) a digital signature of the set of data generated by applying a group signature function to the set of data and the anonymous certificate; and
    transmitting the attestation token to a recipient.

2. The method of claim 1, wherein the group signature scheme is a direct anonymous attestation (DAA) signing scheme.

3. The method of claim 2, wherein the DAA signing scheme is an elliptic curve cryptography (ECC) DAA signing scheme.

4. The method of claim 3, wherein the ECC DAA signing scheme is an ECC DAA signing scheme with Barreto-Naehrig curves.

5. The method of claim 1, wherein the anonymous certificate is an irrevocable anonymous certificate indicating that the client device has been irrevocably assigned to the given signature group.

6. The method of claim 1, wherein the set of device trustworthiness groups comprises at least a first trustworthiness group that includes, as members, devices having a first degree of trustworthiness and a second trustworthiness group that includes, as members, devices having a second degree of trustworthiness less than the first degree of trustworthiness, wherein the given group is one of the first trustworthiness group or the second group.

7. The method of claim 6, wherein the first and second trustworthiness groups have corresponding first and second group public keys published by the device integrity computing system.

8. The method of claim 1, further comprising:
    storing the anonymous certificate in a secure private keystore on the client device.

9. The method of claim 1, wherein the token creation timestamp has a time resolution that is less than a millisecond or less than a microsecond.

10. The method of claim 1, further comprising:
    receiving information indicating an attestation token quantity limit; and
    prior to the creating, verifying that the creating would not exceed the attestation token quantity limit.

11. The method of claim 10, wherein the attestation token quantity limit is a limit on a number of anonymous tokens that are eligible to be sent from the client device to selected destination domain within a selected time frame.

12. The method of claim 10, wherein the attestation token quantity limit is a limit on the number of anonymous tokens that are eligible to be sent from one or more selected applications on the client device to a selected destination domain within a selected time frame.

13. The method of claim 10, wherein the attestation token quantity limit is a limit on the number of anonymous tokens that are eligible to be sent from the client device to selected endpoint within a selected destination domain within a selected time frame.

14. The method of claim 10, wherein the attestation token quantity limit is a limit on the number of anonymous tokens that are eligible to be sent from one or more selected applications on the client device to a selected endpoint within a selected destination domain within a selected time frame.

15. The method of claim 1, further comprising verifying, by the recipient, the digital signature using a group verification key and the anonymous certificate.

16. The method of claim 1, wherein the anonymous certificate comprises a private key issued to the client device.

17. A system, comprising:
    one or more processors of a client device; and
    one or more memories having stored thereon computer readable instructions that, when executed by the one or more processors, cause the one or more processors to perform operations comprising:
        transmitting, to a device integrity computing system, a first request for an anonymous certificate, the request including device-level fraud detection signals for the client device;
        receiving, from the device integrity computing system, the anonymous certificate, wherein the anonymous certificate corresponds to a given signature group selected from a set of device trustworthiness groups based at least on the device-level fraud detection signals, wherein each device trustworthiness group corresponds to a respective category of trustworthiness;
        creating an anonymous attestation token comprising (i) a set of data comprising a second request and an attestation token creation timestamp indicating a time of creation of the anonymous attestation token, and (ii) a digital signature of the set of data generated by applying a group signature function to the set of data and the anonymous certificate; and
        transmitting the attestation token to a recipient.

18. The system of claim 17, wherein the set of device trustworthiness groups comprises at least a first trustworthiness group that includes, as members, devices having a first degree of trustworthiness and a second trustworthiness group that includes, as members, devices having a second degree of trustworthiness less than the first degree of trustworthiness, wherein the given group is one of the first trustworthiness group or the second trustworthiness group.

19. The system of claim 18, wherein the first and second trustworthiness groups have corresponding first and second group public keys published by the device integrity computing system.

20. The system of claim 17, wherein the operations comprise:
  receiving information indicating an attestation token quantity limit; and
  prior to the creating, verifying that the creating would not exceed the attestation token quantity limit.

21. A non-transitory computer readable medium storing instructions that upon execution by one or more computers cause the one or more computers to perform operations comprising:

transmitting, to a device integrity computing system, a first request for an anonymous certificate, the request including device-level fraud detection signals for the client device;

receiving, from the device integrity computing system, the anonymous certificate, wherein the anonymous certificate corresponds to a given signature group selected from a set of device trustworthiness groups based at least on the device-level fraud detection signals, wherein each device trustworthiness group corresponds to a respective category of trustworthiness;

creating an anonymous attestation token comprising (i) a set of data comprising a second request and an attestation token creation timestamp indicating a time of creation of the anonymous attestation token, and (ii) a digital signature of the set of data generated using by applying a group signature function to the set of data and the anonymous certificate; and transmitting the attestation token to a recipient.

* * * * *